June 3, 1952  E. V. DE CARLI  2,599,239
WRINGER DRIVE GEAR MECHANISM
Filed Dec. 28, 1949
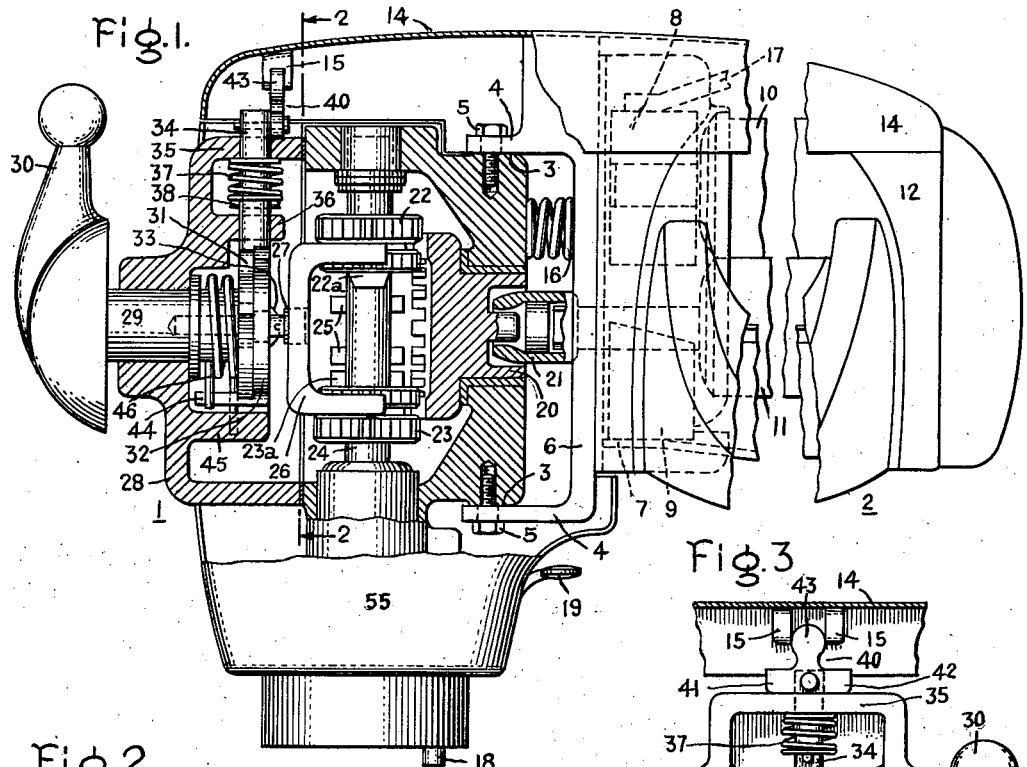
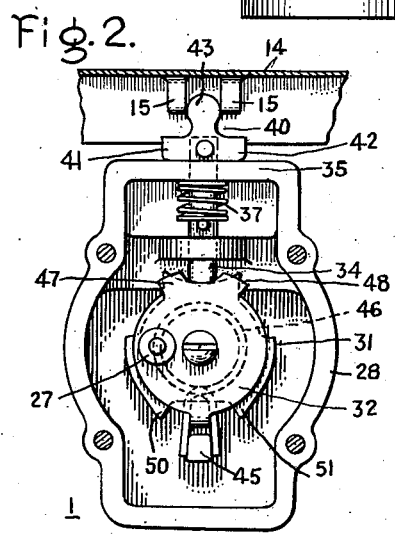
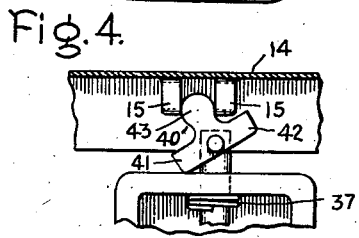
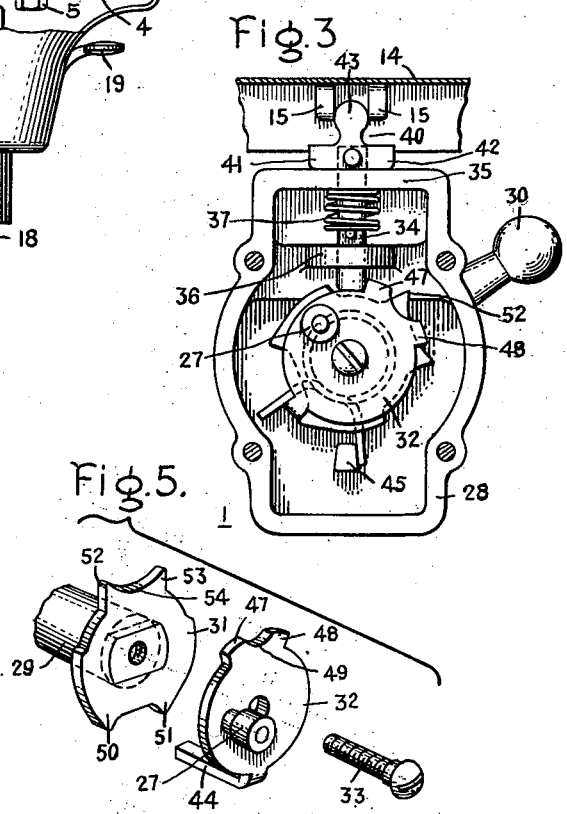
Inventor:
Earl V. De Carli,
by *His Attorney.*

Patented June 3, 1952

2,599,239

UNITED STATES PATENT OFFICE 2,599,239

WRINGER DRIVE GEAR MECHANISM

Earl V. De Carli, Ellington, Conn., assignor to General Electric Company, a corporation of New York Application December 28, 1949, Serial No. 135,512

7 Claims. (Cl. 68—269)

My invention relates to clothes wringers, and particularly to an improved gear shifting and release mechanism for clothes wringers of the motor driven type.

Among the objects of my invention are to provide an improved means for operating the driving gears of a clothes wringer from neutral to a driving position; to provide means for automatically releasing the drive mechanism of a clothes wringer when the wringer frame is pushed or pulled sufficiently to cause it to rotate relative to its support; to provide emergency declutching means which are mechanically simple and low in manufacturing costs but which will function with certainty throughout the life of the wringer; and to provide a power driven clothes wringer with means operating on the gear shifting mechanism thereof for returning the clutch to neutral from either driving position in the event that the wringer capacity is overloaded.

In a presently preferred embodiment of my invention I utilize a relatively conventional wringer head having standard reversible gearing for the roll driving mechanism, and pivotally mount the wringer frame on the head for horizontal movement relative thereto. I employ what I believe to be a novel combination of cam plates and latching means for effecting the gear shifting, latching and emergency release operations. I utilize two cam plates, one which operates the gear shift yoke and the other, fixed to the end of a shift lever shaft, for initially camming a spring biased latch device out of engagement with the first plate and then engaging said plate to rotate it to the desired gear shifted position. A relatively strong coil spring biases the first-named plate to a neutral position. By providing a certain amount of lost motion in the engagement of the respective cam plates the coil spring will not be additionally tensioned until after the spring biased detent has been cammed to a release position. The two springs are not tensioned simultaneously thereby reducing the physical effort required to effect gear shifting. By a simple mechanical association of the latch and the wringer frame the latch is caused to disengage the gear shifting cam when the frame is swung through a small arc, whereupon the reaction of the coil spring will return the clutch mechanism immediately to a neutral position in which the drive roll is disconnected from power.

Experience has indicated that under emergency conditions—particularly where physical pain is present—the operator of a power driven clothes wringer will instinctively push or pull on the wringer frame. In the drive mechanism embodying my invention it is necessary to move the frame through only a small arc to operate the emergency release.

These and other features and objects of the invention will be better understood from a reading of the accompanying specification with reference to the annexed drawing, in which Fig. 1 is a fragmentary side elevation of a wringer embodying a preferred form of my invention, said elevation being in section at the head end of the wringer; Fig. 2 is a section looking in the direction of the arrows 2—2 of Fig. 1; Fig. 3 is a view similar to Fig. 2 but showing the position of the gear shifting elements when the wringer gears are in one of their driving positions; Fig. 4 is a fragmentary elevation showing the operation of the detent pin camming means; and Fig. 5 is an exploded perspective of the gear shifting devices.

The power driven clothes wringer shown in Fig. 1 includes a drive head 1 to which is pivotally attached a wringer frame 2. To facilitate such attachment the head is provided with suitable bearing surfaces 3 which carry the rigid frame extensions 4 and receive the coaxially arranged pivot bolts 5. Said frame extensions project from a main frame-supporting structure 6 with respect to which all of the operating parts of the wringer frame are fixed. As is well known in the art, structures known as "end stiles" are carried by the frame member for the support of the wringer rolls. In Fig. 1 the reference character 7 identifies one such frame stile; the other (not shown) is located at the distal end of the wringer frame. Within said stiles are mounted suitable bearing blocks such as 8, 9 which journal the shafts of the upper and lower wringer rolls 10, 11. The frame structure is masked by a suitable cover assembly 12, the upper portion 14 of which is rigidly affixed to the frame structure 6. Adjacent its end the upper cover 14 is provided with the spaced downwardly depending lugs 15 sufficiently remote from the pivot bolts 5 to produce a relatively large displacement of the lugs with respect to the head when the wringer frame is rotated through a small angle. Coil springs 16, preferably two in number and spaced symmetrically with respect to the pivot axis of the bolts 5, are supported between the wringer head and the frame member 6 to hold the frame centered with respect to the head. The conventional bow spring 17 exerts pressure against the upper roll blocks to determine the operating pressure of the rollers 10, 11.

The wringer head is intended to be supported in conventional fashion on a fixed post or the like (not shown) extending from the washing machine and may be indexed about said post to one of several operating positions by means including a latching pin 18 and a releasing lever 19, as well understood in the art. The roll driving mechanism per se is likewise conventional; a crown gear 20 is journaled in the wringer head and connected by means of a universal joint fitting 21 to the shaft of lower roll 11 to drive the same; and said crown gear is arranged to be driven in either direction according to which of the pinions 22, 23, freely carried on the power shaft 24, is drivingly connected to said shaft by the engagement of the respective pinion clutch jaws 22a, 23a with the adjacent drive pins 25 extending from shaft 24.

Pinions 22, 23 are maintained in fixed mutually spaced relationship and in continuous mesh with gear 20 by the shift yoke 26, the ends of said yoke being forked to ride within the circumferential slots of the pinions 22, 23. The shift yoke is arranged to be supported in neutral or driving position by means of a shift roller or finger 27 which rides within a pocket provided in said yoke.

The yoke shift mechanism and the releasable detent which indexes the drive mechanism in its neutral or its driving position are mounted in a cover structure 28 of the wringer head. The mechanism includes a shaft 29 journaled in said cover and arranged to be rotated by any suitable means, for example, a shift handle 30 fixed thereto. The mechanism further includes a cam plate 31 secured to shaft 29 for rotation therewith, see Fig. 5, and a second cam plate 32 is supported on shaft 29 for rotation thereon independently of plate 31, as by the shouldered screw 33 which enters the axis of the shaft. The shift finger is eccentrically affixed to the plate 32, as clearly appears in Fig. 5; and it will be apparent that as cam plate 32 is rotated in either direction from its Fig. 2 position the yoke will be shifted upwardly or downwardly to cause one or the other of the pinion jaws to engage with the power shaft drive pins. The gear 20 may thus be selectively driven in forward or reverse direction. The latch pin 34 or detent means is centered with respect to the cam plates and is guided for vertical movement relative thereto by the upper cover wall 35 and a projecting wall structure 36. Said latch member is biased toward the cam plates by any suitable means; for example, by the coil spring 37 which is confined between the wall 35 and an anchor 38 carried on the latching pin 34. Pivotally affixed to the latching pin above the cover 28 is a lifter 40 which includes leg portions 41, 42 projecting equally from the lifter pivot 43 and normally resting on the upper wall of the cover 28 under the urging of the spring 37. The lifter has a substantially circular head 43 which rides between the lugs 15, preferably in tangential contact with the inner walls thereof.

The indexing and camming elements of the respective plates 31, 32 may best be explained in connection with the operation of the shifting mechanism, as follows:

Cam plate 32 is provided with a rigid finger 44 which extends beneath the shaft 29 in the plane of the axis thereof. Coiled about shaft 29 and having crossed leg portions which straddle the finger 44 and a fixed abutment 45 is a coil spring 46 effective strongly to bias the plate 32 to its centered or neutral position of Fig. 2. Plate 32 has the symmetrically arranged projects 47, 48 between which is a notch 49 which receives the end of the latch pin 34 when the mechanism is in neutral position. When the projections 47 or 48 are carried beyond the latch pin 34 the pin will rest upon the adjacent edge of cam plate 32. The notch 49 and the edges of plate 32 immediately adjacent the projections 47, 48 respectively represent indexing positions for neutral or either of two driving positions. It has previously been noted that the respective cam plates 31 and 32 are rotationally independent. To effect rotation of the plate 32 as the shaft 29 and its thereto affixed cam 31 is rotated I provide said cam 31 with spaced projections 50, 51 which straddle the finger 44. Diametrically opposite said projections, cam plate 31 is formed with projections 52, 53, at the respective ends of a concave cam surface 54. With the shift handle in its Fig. 1 position the latch pin 34 occupies the center of the cam 54 and the notch 49. It will be seen from Fig. 2 that the pin 34 rests upon the edge surface of each cam plate. When handle 30 is rotated from the Fig. 2 to the Fig. 3 position the plate 31 will rotate through about 25 degrees lost motion before the wall of the projection 51 engages the edge of the finger 44. During this initial movement, the pin 34 will be cammed upwardly by the rising surface of cam 54 and by the time rotation of cam plate 32 commences, the projection 52 will have raised pin 34 above the top of projection 47 of plate 32. Continued rotation will bring the respective projections completely beyond the pin 34, which will be driven downwardly by spring 37 against the surface of cam 32 to index said cam in one of its driving positions. The driving means is stabilized in said position by the reaction of the coil spring 46 which biases the plate 32 into counter-clockwise rotation and thus maintains the edge of the projection 47 against the pin 34. It will be noted from Fig. 3 that in any driving position the pin 34 rests only upon the cam plate 32. If now it is desired to return the gear to neutral, handle 30 is rotated counterclockwise of Fig. 3 and before the plate 32 will be rotated the projection 52 will cam the latching pin 34 out of the path of projection 47, following which the reaction of the spring 46 will drive the plates 31 and 32 and yoke 26, to neutral position. It will be seen that during the operation from neutral to a driving position the respective springs 37 and 46 are individually, and not concurrently, tensioned. To release the latching mechanism, only spring 37 need be compressed.

The shift from neutral to the other driving position calls for a counter-clockwise rotation of handle 30 from the Fig. 2 position.

If the wringer is in a driving position and must be stopped in an emergency, the operator may push or pull on the frame 2 sufficiently to cause rotation of the frame above its pivot bolts 5, whereupon one or the other of lugs 15 will rotate the latch pin lifter about the outermost corner of its leg 41 or 42 to cause said lifter to raise the pin 34. Typical action is shown in Fig. 4. When the latch pin clears the indexing projection of plate 32, the spring 46 will drive the cam plate 32 and shift yoke 26 to a neutral position. Springs 16 will return the frame to its initial position. It will be apparent from comparison of Figs. 3 and 4 that the lifter proportions are such that at most only a small displacement of the wringer frame is necessary to effect a disconnection of the drive mechanism. It will be noted that the top frame member 14 is structurally independent of the head cover 55, and it will be understood that the portion of said head cover below the wringer frame permits rotation of the latter.

In the circumstance that articles too bulky for passage between the rolls are presented thereto, the frame reaction will produce rotation about the pivot bolts 5 and the drive mechanism will throw to neutral position before damage to the wringer can occur.

The arrangement of the shift-yoke and emergency release operating mechanisms is particularly advantageous for low manufacturing and service costs. All parts are carried by the cover plate 28 which, it will be understood, is bolted or otherwise removably affixed to the head, and the entire structure may be constructed as a sub-assembly and readily fitted to the drive gearing.

While I have shown a particular embodiment of my invention, it will be understood, of course that I do not wish to be limited thereto since many modifications may be made; and I therefore contemplate by the appended claims to cover any such modifications as fall within the true spirit and scope of my invention.

What I claim as new and desire to secure by Letters Patent of the United States is:

1. In a clothes wringer having a wringer head, a frame carried thereby, rolls mounted in the frame, roll driving mechanism within said head and including drive gearing having forward, reverse, and neutral operating positions and a gear shift yoke for establishing said positions: a control device for operating said shift yoke, comprising shaft means journaled in said head, means for rotating said shaft, a cam plate fixed to said shaft for rotation therewith, a second cam plate carried by said shaft for rotation independently thereof, said second plate having means engaging said shift yoke to operate the same, said second plate having indexing means establishing the operating positions thereof, springs means disposed about said shaft means and engageable with said second plate to bias the same to its neutral position, detent means biased for engagement with the indexing means of said second plate, cam means on said first plate effective upon rotation thereof to engage the detent means and urge the same to release temporarily the said indexing means, and drive means on said first plate engaging with said second plate to rotate the same to another operational position, said cam means during said rotation releasing said detent means for engagement thereof with an index position of said second plate.

2. In a clothes wringer having a wringer head, a frame carried thereby, rolls mounted in the frame, roll driving mechanism within said head and including drive gearing having forward, reverse, and neutral operating positions and a gear shift yoke for establishing said positions: a control device for operating said shift yoke, comprising shaft means journaled in said head, means for rotating said shaft, a cam plate fixed to said shaft for rotation therewith, a second cam plate carried by said shaft for rotation independently thereof, said second plate having means eccentrically engaging said shift yoke to move the same to a desired gear driving position and having indexing means establishing the neutral or driving positions thereof, detent means slidably mounted in said head above said plates and biased for engagement with the indexing means of said second plate, cam means on said first plate effective upon rotation thereof to engage the detent means and urge the same to release temporarily the said indexing means, said first plate having spaced projections selectively engageable with said second plate to rotate the same to another operational position, said cam means releasing said detent means for engagement thereof with an index position of said second plate.

3. In a clothes wringer having a wringer head, a frame carried thereby, rolls mounted in the frame, roll driving mechanism within said head and including drive gearing having forward, reverse, and neutral operating positions and a gear shift yoke for establishing said positions: a control device for operating said shift yoke, comprising shaft means journaled in said head, means for rotating said shaft, a cam plate fixed to said shaft for rotation therewith, a second cam plate carried by said shaft for rotation independently thereof, said second plate having means for moving said shift yoke to a desired gear driving position and having indexing means establishing the neutral or driving positions thereof, a drive finger extending from said second plate, spring means disposed about said shaft means and having a pair of opposed legs selectively engageable with said finger for biasing said second plate to its neutral position, detent means slidably mounted in said head symmetrically above said cam plates for engagement thereby, spring means biasing said detent means into engagement with the indexing means of said second plate, cam means on said first plate effective upon rotation thereof to engage the detent means and urge the same to release temporarily the said indexing means, and drive means on said first plate effective after limited rotation thereof to engage with said finger to rotate said second plate to another operational position, said cam means releasing said detent means for engagement thereof with an index position of said second plate.

4. In a clothes wringer having a wringer head, a frame carried thereby, rolls mounted in the frame, roll driving mechanism within said head and including drive gearing having forward, reverse, and neutral operating positions and a gear shift yoke for establishing said positions: a cover structure removably affixed to said head, a control device for operating said shift yoke, said control device being carried entirely by said cover structure and including a shaft journaled in said cover, means for rotating said shaft, a cam plate fixed to said shaft for rotation therewith, a second plate mounted for rotation relative to said first plate, said second plate having means mounted eccentrically thereon and releasably engaging said shift yoke for camming said yoke into movement between neutral and driving positions, detent means carried by said cover for displacement therein, spring means biasing said detent means into engagement with said second plate to establish one or the other of said yoke shifted positions, means cooperating between said first and second plates to provide a lost motion drive therebetween whereby said second plate may be rotated with said shaft following a predetermined initial rotation thereof, and cam means on said first plate engageable with said detent means during said initial rotation to urge the same out of engagement with said second plate.

5. A clothes wringer of the motor driven type, comprising a head, a frame pivotally mounted thereof, rolls journaled in said frame, drive means in said head for rotating said rolls in forward or reverse direction, said drive means including reversing gearing and a shift yoke for establishing neutral, forward and reverse driving positions of said gearing, a shaft journaled in said head, means for rotating said shaft, a cam plate fixed to said shaft for rotation therewith, a second plate fixed for rotation relative to said shaft, said second plate having means eccentrically engaging said yoke to shift the same between neutral and driving positions upon rotation of said second plate, spring means biasing said second plate to return to neutral position, detent means slidably carried by said head and projecting through a wall thereof, means biasing said detent means releasably into engagement with said second plate to retain the same against the bias of said spring, a lost motion driving connection between said plates to enforce rotation of the second plate following an initial rotation of said shaft, cam means on said first plate engaging with said detent means to cause it to release said second plate during said initial rotation, and means in engagement with said wringer frame and said detent means to release said detent means from engagement with second plate upon movement of said frame relative to said head.

6. A clothes wringer according to claim 5, in which the last-named means include a cam member fixed to said detent means to effect displacement thereof upon rotation of said cam member, and means on said frame engaging with said cam member to rotate the same upon rotation of said frame.

7. A clothes wringer according to claim 5, in which the last-named means include a detent actuator comprising a member pivoted to said detent means and having leg portions extending oppositely from said pivot point normally resting upon said wringer head and a head portion above and symmetrically arranged with respect to said leg portions, and lugs on said frame engaging with said actuator head portion, whereby rotation of said frame in either direction will enforce rotation of said actuator about one of said leg portions as a pivot and will thereby effect displacement of said detent means.

EARL V. DE CARLI.

REFERENCES CITED

The following references are of record in the file of this patent:

UNITED STATES PATENTS

| Number | Name | Date |
| --- | --- | --- |
| 2,067,603 | Getz | Jan. 12, 1937 |
| 2,336,233 | Dunham | Dec. 7, 1943 |
| 2,369,333 | Bottinelli | Feb. 13, 1945 |